(12) United States Patent
Liang et al.

(10) Patent No.: US 11,840,656 B2
(45) Date of Patent: Dec. 12, 2023

(54) HALOGEN FREE FLAME-RETARDANT MATERIALS AND METHOD FOR MANUFACTURING THE SAME

(71) Applicant: Industrial Technology Research Institute, Hsinchu (TW)

(72) Inventors: Wen-Chung Liang, Hsinchu (TW); Chi-Lang Wu, Miaoli County (TW); Chen-Yu Huang, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 4 days.

(21) Appl. No.: 17/519,587

(22) Filed: Nov. 5, 2021

(65) Prior Publication Data

US 2023/0145884 A1    May 11, 2023

(51) Int. Cl.
| | |
|---|---|
| C09K 21/02 | (2006.01) |
| C09K 21/14 | (2006.01) |
| C08L 83/06 | (2006.01) |
| C09K 3/10 | (2006.01) |

(52) U.S. Cl.
CPC .............. C09K 21/14 (2013.01); C08L 83/06 (2013.01); C09K 21/02 (2013.01); C08L 2201/02 (2013.01); C09K 2003/1078 (2013.01)

(58) Field of Classification Search
CPC ........ C08L 67/00; C08L 67/02; C08L 67/025; C08L 67/03; C08L 74/04; C08L 74/06; C08L 74/08; C08L 83/06; C08L 2201/02; C08K 21/02; C08K 21/04; C08K 21/06; C08K 21/10; C08K 21/12; C08K 21/14; C08K 2203/1073

See application file for complete search history.

(56) References Cited

U.S. PATENT DOCUMENTS

| | | | |
|---|---|---|---|
| 4,397,974 A | 8/1983 | Goyert et al. | |
| 5,391,682 A | 2/1995 | Ogawa et al. | |
| 6,093,760 A * | 7/2000 | Nishihara | C08K 5/523 |
| | | | 524/436 |
| 6,303,666 B1 | 10/2001 | Yorita et al. | |
| 7,459,500 B2 | 12/2008 | Tau et al. | |
| 7,579,407 B2 | 8/2009 | Tau et al. | |
| 9,150,984 B2 | 10/2015 | Custodero et al. | |
| 9,156,978 B1 | 10/2015 | Cai et al. | |
| 9,365,715 B2 | 6/2016 | Knoll et al. | |
| 9,617,661 B2 | 4/2017 | Custodero et al. | |
| 9,617,662 B2 | 4/2017 | Pottier et al. | |
| 9,920,166 B2 * | 3/2018 | Makadia | C08K 5/49 |
| 10,889,146 B2 | 1/2021 | Greiveldinger et al. | |
| 2011/0288226 A1 * | 11/2011 | Mehta | C08K 3/36 |
| | | | 524/506 |
| 2014/0234620 A1 * | 8/2014 | Zhu | H01B 3/441 |
| | | | 428/373 |
| 2016/0083560 A1 * | 3/2016 | Fudala | C09K 21/12 |
| | | | 524/101 |

FOREIGN PATENT DOCUMENTS

| | | | | |
|---|---|---|---|---|
| CA | 2821015 A1 * | 6/2012 | ............ | C09K 21/14 |
| CN | 1821296 | 8/2006 | | |
| CN | 101528834 | 9/2009 | | |
| CN | 103881242 A * | 6/2014 | ............ | C08L 75/04 |
| CN | 104448574 | 3/2015 | | |
| CN | 106232722 A * | 12/2016 | ............ | C08L 75/04 |
| CN | 106317850 | 1/2017 | | |
| CN | 106916438 | 7/2017 | | |
| CN | 107857988 | 3/2018 | | |
| CN | 108410045 | 8/2018 | | |
| CN | 109337029 | 2/2019 | | |
| CN | 110982209 A * | 4/2020 | ............ | C08L 53/025 |
| CN | 112375371 A * | 2/2021 | ............ | C08L 75/06 |
| JP | 2015212390 | 11/2015 | | |
| KR | 101808829 | 12/2017 | | |
| TW | 533125 | 5/2003 | | |
| TW | 200505986 | 2/2005 | | |
| TW | 200946584 | 11/2009 | | |
| TW | M567270 | 9/2018 | | |
| WO | 2019037397 | 2/2019 | | |

OTHER PUBLICATIONS

Fatma Kucuk et al., "Effect of silane-modification of diatomite on its composites with thermoplastic polyurethane," Materials Chemistry and Physics, Aug. 2020, pp. 1-9.

D.Tabuani et al., "Flame retarded Thermoplastic Polyurethane (TPU) for cable jacketing application," Polymer Degradation and Stability, Jan. 2012, pp. 2594-2601.

Le Wan et al., "Flame-retarded thermoplastic polyurethane elastomer: From organic materials to nanocomposites and new prospects," Chemical Engineering Journal, Mar. 2021, pp. 1-15.

Magdalena Serkis et al., "Nanocomposites made from thermoplastic waterborne polyurethane and colloidal silica. The influence of nanosilica type and amount on the functional properties," Progress in Organic Coatings , Jul. 2016, pp. 342-349.

Huawei Wang et al., "Preparation of cobalt-based metal organic framework and its application as synergistic flame retardant in thermoplastic polyurethane (TPU)," Composites Part B: Engineering, Sep. 2019, pp. 1-11.

(Continued)

*Primary Examiner* — Matthew R Diaz

(74) *Attorney, Agent, or Firm* — JCIPRNET

(57) ABSTRACT

The disclosure provides a forming method of a halogen-free flame-retardant material. The method includes the followings. A twin-screw extruder including a first zone and a second zone is used. A mixture in the first zone is mixed, melted and heated to form a molten mixture. The mixture includes a halogen-free flame retardant, a wear-resistant modifier, a thermoplastic elastomer, and an antioxidant. In addition, a silane-modified nano-silica aqueous suspension is introduced into the second zone to mix the silane-modified nano-silica aqueous suspension with the molten mixture from the first zone. The first zone and the second zone are continuously connected regions.

15 Claims, No Drawings

(56) References Cited

OTHER PUBLICATIONS

D. J. Martin et al., "Chapter 11: Thermoplastic polyurethane (TPU)-based polymer nanocomposites," Woodhead Publishing Limited, Oct. 2012, pp. 321-350.
"Office Action of Taiwan Counterpart Application", dated Oct. 4, 2022, p. 1-p. 4, Note: No English language translation/version filed.

* cited by examiner

HALOGEN FREE FLAME-RETARDANT MATERIALS AND METHOD FOR MANUFACTURING THE SAME

TECHNICAL FIELD

The disclosure relates to a halogen-free flame-retardant material formed by using a twin-screw extruder with different zones to mix a silane-modified nano-silica aqueous suspension and a molten mixture and a method of forming the same.

DESCRIPTION OF RELATED ART

Electrical wires and cables can be seen anywhere in life. Cable sheathing materials thereof mostly include PVC, while the rest are mainly cross-linked plastic rubber. However, the above-mentioned materials are often regarded as not environmentally friendly due to toxic substances that may be produced during processing or difficulty in recycling and reuse. Accordingly, there is a tendency toward using thermoplastic elastomers, which are easier to be recycled, together with the application of halogen-free flame retardants. Nonetheless, when the thermoplastic elastomer is applied to the electrical wires and cables that emphasize flexibility, insufficiency in wear resistance remains a problem. Therefore, the integration of nano powder with the thermoplastic elastomer is considered as an important means to improve the wear resistance and mechanical strength of the cable sheathing materials, but nanopowder is inherently unlikely to disperse in the thermoplastic elastomer.

In summary of the foregoing, there is currently an urgent need for a new material composition and manner of processing to overcome the above-mentioned disadvantage of poor dispersion so as to meet the requirements for environmentally friendly materials with highly wear resistant, halogen-free, and highly flame-retardant properties.

SUMMARY

An embodiment of the disclosure discloses a forming method of a halogen-free flame-retardant material, and the method includes the following. A twin-screw extruder including a first zone and a second zone is used. A mixture in the first zone is mixed, melted and heated to form a molten mixture. The molten mixture includes a halogen-free flame retardant, a wear-resistant modifier, a thermoplastic elastomer, and an antioxidant. In addition, a silane-modified nano-silica aqueous suspension is introduced into the second zone to mix the silane-modified nano-silica aqueous suspension with the molten mixture from the first zone. The first zone and the second zone are continuously connected regions.

Another embodiment of the disclosure discloses a halogen-free flame-retardant material prepared by using the above-mentioned forming method. The halogen-free flame-retardant material has an wear resistance of less than 40 mg, a hardness (shore A) of less than 85, a tensile strength of greater than 120 kgf/cm$^2$, an elongation of greater than 300%, and a flame retardancy achieving a UL94 V-0 rating at a specimen thickness of 0.8 mm.

Still another embodiment of the disclosure discloses a wear-resistant halogen-free flame-retardant cable sheathing material, including the above-mentioned halogen-free flame-retardant material.

To make the aforementioned features of the invention more obvious and comprehensible, embodiments accompanied with drawings are particularly described in detail below.

BRIEF DESCRIPTION OF THE DRAWINGS

None.

DESCRIPTION OF THE EMBODIMENTS

An embodiment of the disclosure provides a forming method of a halogen-free flame-retardant material, and the method includes the following. A twin-screw extruder including a first zone and a second zone is used. The first zone and the second zone are continuously connected regions. In addition, a mixture in the first zone is mixed, melted and heated to form a molten mixture. The mixture includes a halogen-free flame retardant, a wear-resistant modifier, a thermoplastic elastomer, and an antioxidant. Then, a silane-modified nano-silica aqueous suspension is introduced into the second zone to mix the silane-modified nano-silica aqueous suspension with the molten mixture from the first zone.

In some embodiments, the silane-modified nano-silica aqueous suspension includes silane, nano-silica powder, and water.

In some embodiments, the halogen-free flame retardant includes a phosphorus nitrogen flame retardant, aluminum phenylphosphinate, aluminum hypophosphite, melamine cyanurate, a phosphate amine salt, or phosphate esters. For the wear-resistant modifier, a siloxane polymer, vinyl polydimethylsiloxane, or a methicone silsesquioxane crosspolymer may be adopted. The thermoplastic elastomer includes polyether type thermoplastic polyurethane, polyester type thermoplastic polyurethane, a polyether type thermoplastic polyester elastomer, or a polyester type thermoplastic polyester elastomer. The antioxidant includes a hindered phenolic antioxidant, bis[3-(1,1-dimethylethyl)-4-hydroxy-5-methylbenzenepropionic acid] tripolyethylene glycol, or a hindered phenolic composite type antioxidant.

In some embodiments, the mixture may also include a volume resistivity enhancer modified elastomer, such as a styrene-ethylene/butylene-styrene copolymer thermoplastic elastomer or a polyolefin elastomer.

In some embodiments, based on 100 parts by weight of the total weight of the mixture, a content of the halogen-free flame retardant is 15 to 45 parts by weight, for example, about 15 to 40 parts by weight, about 15 to 30 parts by weight, and about 15 to 20 parts by weight, but not limited thereto.

In some embodiments, based on 100 parts by weight of the weight of the thermoplastic elastomer, a content of the wear-resistant modifier is 1 to 10 parts by weight, for example, about 1 to 7 parts by weight and about 1 to 5 parts by weight, but not limited thereto.

In some embodiments, based on 100 parts by weight of the weight of the thermoplastic elastomer, a content of the antioxidant is 0.2 to 1.5 parts by weight, for example, about 0.2 to 0.7 part by weight and about 0.2 to 0.5 part by weight, but not limited thereto.

In some embodiments, based on 100 parts by weight of the total weight of the mixture, a content of the nano-silica powder is 0.5 to 12 parts by weight, for example, about 0.5 to 10 parts by weight and about 0.5 to 5 parts by weight, but not limited thereto.

In some embodiments, based on 100 parts by weight of the total weight of the mixture, a content of the volume resistivity enhancer modified elastomer is 5 to 30 parts by weight, for example, about 5 to 20 parts by weight and about 5 to 10 parts by weight, but not limited thereto.

In some embodiments, a forming method of the silane-modified nano-silica aqueous suspension may include the following. Under a room temperature condition, nano-silica powder is added into deionized water and stirred to form a nano-silica mixed aqueous solution. Then, an alkaline solution of 20 ml of 1M KOH and an acid solution of 20 ml of 1M HCl are sequentially added to adjust the pH value of the nano-silica mixed aqueous solution to neutral. After filtering and drying, the treated nano-silica are mixed and stirred with 7.5 g of silane, 2.5 of suspending agent, and 500 g of water to form a silane-modified nano-silica aqueous suspension. For example, the silane may be (3-glycidyloxypropyl)trimethoxysilane (GPTMS), hexamethyldisilane (HMDS), vinyltriethoxysilane (VTES), and polydimethylsiloxane (PDMS).

In some embodiments, a temperature of the first zone of the twin-screw extruder is set to 120° C. to 200° C., and a temperature of the second zone of the twin-screw extruder is set to 120° C. to 200° C.

In some embodiments, a pump pressure for introducing the silane-modified nano-silica aqueous suspension into the second zone may be 20 to 50 bars. An excessively high pump pressure causes the twin-screw extruder to have a comparatively high torque value and be relatively energy-consuming. An extremely low pump pressure causes failure in maintaining a stable flow of the (3-glycidyloxypropyl)trimethoxysilane-modified nano-silica aqueous suspension into the twin-screw extruder.

In some embodiments, the screws have a rotation speed of 60 rpm to 300 rpm. In some embodiments, a halogen-free flame-retardant material manufactured using the above-mentioned forming method has a wear resistance of less than 40 mg, a hardness (shore A) of less than 85, a tensile strength of greater than 120 kgf/cm$^2$, an elongation of greater than 300%, and a flame retardancy achieving a UL94 V-0 rating at a specimen thickness of 0.8 mm. Therefore, a wear-resistant halogen-free flame-retardant cable sheathing material including the halogen-free flame-retardant material also has the technical efficacy of low hardness, high wear resistance, and high flame retardancy.

Experiments are listed below to verify the efficacy of the invention, but the invention is not limited to the following content.

Preparation Example

Preparation Example 1

100 grams of nano-silica powder (purchased from Trump Chemical, Aerosil 200, 100 to 500 nm) was obtained, and after the nano-silica powder was stirred and mixed with 100 ml of 1M KOH for 2 hours, 10 to 50 ml of 1M HCl was added to adjust the pH value of the nano-silica mixed aqueous solution to neutral. After filtering and drying, the treated nano-silica was stirred with 1.5 grams of (3-glycidyloxypropyl)trimethoxysilane (GPTMS) (purchased from Echo Chemical), 1.25 grams of a suspending agent, and 250 grams of deionized water to form a (3-glycidyloxypropyl)trimethoxysilane-modified nano-silica aqueous suspension with a concentration of about 40 wt %. It was expected that, after the modification, grafted-silane will be formed on the surface of the nano-silica.

Preparation Example 2

A modified nano-silica aqueous suspension was prepared using the method of Preparation Example 1, but GPTMS therein was changed into hexamethyldisilane (HMDS) (purchased from Chongxin Trading), to form a hexamethyldisilane-modified nano-silica aqueous suspension with a concentration of about 40 wt %. It was expected that, after the modification, grafted-silane will be formed on the surface of the nano-silica.

Comparative Preparation Example 1

A nano-silica aqueous suspension was prepared using the method of Preparation Example 1, but silane was not added for modification.

Experimental Example

Experimental Examples 1 to 6

Raw materials: thermoplastic polyurethane (purchased from Coating Chemical, ER-85A), halogen-free flame retardant (purchased from Anchem Technology, SONGFLAM-203), siloxane polymer (purchased from DuPont, model MB50-017), antioxidant (purchased from BASF, model Irganox-245), and the suspension of Preparation Example 1.

According to the proportions in Table 1, a mixture containing thermoplastic polyurethane (TPU), halogen-free flame retardant, siloxane polymer, and antioxidant was directly introduced from the main inlet of the twin-screw extruder into the first zone of the twin-screw extruder, and was mixed, melted and heated at a temperature of 120 to 180° C. and a screw rotation speed of 250 rpm to form a molten mixture.

With a high-pressure pump under a pressure of 40 bars, according to the proportions in Table 1, the (3-glycidyloxypropyl)trimethoxysilane-modified nano-silica (nano-$SiO_2$) suspension obtained in Preparation Example 1 was introduced from the side inlet of the twin-screw extruder into the second zone of the twin-screw extruder, and was mixed with the molten mixture from the connected first zone, where the side inlet had a temperature of 180° C., and the second zone had a temperature of 200° C. and a screw rotation speed of 250 rpm. During the process, a flow of the suspension of Preparation Example 1 was controlled by a flow controller, so that the proportions of raw materials in the mixture retained after passing through the second zone were in accordance with Table 1. After extruding the mixture as a strand through water, and pelletizing it with the twin-screw extruder, the mixture was then placed in an oven at 105° C. for 4 hours to obtain a halogen-free flame-retardant material. A mechanical test, a flame retardancy test, and a wear resistance test were performed on the manufactured halogen-free flame-retardant material, and the results are also shown in Table 1.

Comparative Example 1

A halogen-free flame-retardant material was manufactured using the method of Experimental Example 1, but the suspension of Preparation Example 1 was not added, and the rest of the raw materials were in the proportions as shown in Table 1.

Then, a mechanical test, a flame retardancy test, and a wear resistance test were performed on the halogen-free flame-retardant material of Comparative Example 1, and the results are also shown in Table 1.

Comparative Example 2

A halogen-free flame-retardant material was manufactured using the method of Experimental Example 1, but a content of t(3-glycidyloxypropyl)trimethoxysilane-modified nano-silica of Preparation Example 1 was above 5 parts by weight.

Then, a mechanical test, a flame retardancy test, and a wear resistance test were performed on the halogen-free flame-retardant material of Comparative Example 2, and the results are also shown in Table 1.

TABLE 1

|  | Comparative Example 1 | Experimental Example 1 | Experimental Example 2 | Experimental Example 3 | Experimental Example 4 | Experimental Example 5 | Experimental Example 6 | Comparative Example 2 |
|---|---|---|---|---|---|---|---|---|
| TPU (parts by weight) | 82 | 81.5 | 81 | 80 | 79 | 78 | 77 | 72 |
| Halogen-free flame retardant (parts by weight) | 18 | 18 | 18 | 18 | 18 | 18 | 18 | 18 |
| Nano-$SiO_2$ (parts by weight) | 0 | 0.5 | 1 | 2 | 3 | 4 | 5 | 10 |
| Antioxidant (phr) | 0.3 | 0.3 | 0.3 | 0.3 | 0.3 | 0.3 | 0.3 | 0.3 |
| Siloxane polymer (phr) | 1 | 1 | 1 | 1 | 1 | 1 | 1 | 1 |
| Hardness (shore A) | 82 | 82 | 82 | 84 | 84 | 84 | 85 | 87 |
| Tensile strength ($kgf/cm^2$) | 218 | 230 | 235 | 212 | 200 | 189 | 165 | 97 |
| Elongation (%) | 576 | 556 | 596 | 569 | 589 | 543 | 307 | 310 |
| Flame retardancy (UL94 0.8 mm) | V-0 | V-0 | V-0 | V-0 | V-0 | V-0 | V-0 | V-0 |
| Wear resistance (mg) | 45 | 27 | 26 | 22 | 23 | 22 | 21 | 120 | phr: parts by weight added per hundred parts by weight of thermoplastic resin.

As can be seen in Table 1, the halogen-free flame-retardant material of the disclosure has excellent wear resistance and also superior flame retardancy.

Experimental Examples 7 to 10

A halogen-free flame-retardant material was manufactured using the method of Experimental Example 1. According to the proportions in Table 2, the contents of thermoplastic polyurethane, halogen-free flame retardant, suspension of Preparation Example 1, and antioxidant were fixed, and the content of the siloxane polymer of Preparation Example 1 was changed.

Then, the halogen-free flame-retardant materials manufactured in Experimental Examples 7 to 10 were subjected to a mechanical test, a flame retardancy test, and a wear resistance test, and the results together with the values of Experimental Example 3 are shown in Table 2.

TABLE 2

|  | Experimental Example 3 | Experimental Example 7 | Experimental Example 8 | Experimental Example 9 | Experimental Example 10 |
|---|---|---|---|---|---|
| TPU (parts by weight) | 80 | 80 | 80 | 80 | 80 |
| Halogen-free flame retardant (parts by weight) | 18 | 18 | 18 | 18 | 18 |
| Nano-$SiO_2$ (parts by weight) | 2 | 2 | 2 | 2 | 2 |
| Antioxidant (phr) | 0.3 | 0.3 | 0.3 | 0.3 | 0.3 |
| Siloxane polymer (phr) | 1 | 2 | 3 | 4 | 5 |
| Hardness (shore A) | 84 | 82 | 82 | 81 | 81 |
| Tensile strength ($kgf/cm^2$) | 212 | 190 | 189 | 162 | 147 |
| Elongation (%) | 569 | 596 | 622 | 589 | 543 |
| Flame retardancy (UL94 0.8 mm) | V-0 | V-0 | V-0 | V-0 | V-0 |
| Wear resistance (mg) | 22 | 28 | 27 | 23 | 22 |

As can be obtained from Table 2, the disclosure having the halogen-free flame-retardant material with 1 to 5 phr siloxane can achieve excellent wear resistance, and also superior in flame-retardancy and other mechanical properties.

Experimental Examples 11 and 12

A halogen-free flame-retardant material was manufactured using the method of Experiment 1, and according to the proportions in Table 3, a styrene-ethylene/butylene-styrene copolymer (SEBS) thermoplastic elastomer (purchased from TSRC, taipol 6150) was also added into the first zone of the twin-screw extruder.

Then, the halogen-free flame-retardant materials manufactured in Experimental Examples 11 and 12 were subjected to a mechanical test, a flame retardancy test, and a wear resistance test, and a volume resistance was detected. The results are also shown in Table 3.

TABLE 3

|  | Experimental Example 11 | Experimental Example 12 |
|---|---|---|
| TPU (parts by weight) | 75 | 70 |
| Halogen-free flame retardant (parts by weight) | 18 | 18 |
| SEBS (parts by weight) | 5 | 10 |
| Nano-$SiO_2$ (parts by weight) | 2 | 2 |
| Antioxidant (phr) | 0.3 | 0.3 |
| Siloxane polymer (phr) | 2 | 2 |
| Hardness (shore A) | 83 | 83 |
| Tensile strength ($kgf/cm^2$) | 210 | 183 |
| Elongation (%) | 556 | 569 |
| Flame retardancy (UL94 0.8 mm) | V-0 | V-0 |

TABLE 3-continued

|  | Experimental Example 11 | Experimental Example 12 |
|---|---|---|
| Wear resistance (mg) | 38 | 35 |
| Volume resistance (Ω · cm) | 1.2E+13 | 1.3E+13 |

As can be seen in Table 3, by adding SEBS into the halogen-free flame-retardant material of the disclosure, the volume resistance can be further improved, and the wear resistance is still better than Comparative Examples 1 and 2.

Comparative Examples 3 to 5 below are for investigating the effects of nano-silica on mechanical strength and wear resistance, and thus do not contain halogen-free flame retardant and siloxane polymer.

Comparative Example 3

Raw materials: thermoplastic polyurethane (purchased from Coating Chemical, ER-85A), nano-silica (purchased from Trump Chemical, Aerosil 200, 100 to 500 nm), and antioxidant (purchased from BASF, Irganox-245).

According to the proportions in Table 4, the thermoplastic polyurethane (TPU), nano-silica, and antioxidant were directly introduced from the main inlet of the twin-screw extruder into the first zone and the connected second zone of the twin-screw extruder, and were mixed, melted and heated at a temperature of 120 to 200° C. and a screw rotation speed of 250 rpm to form a molten mixture.

After extruding the mixture as a strand through water, and pelletizing it with the twin-screw extruder, the mixture was then placed in an oven at 105° C. for 4 hours to obtain a composition without halogen-free flame retardant and siloxane polymer. A mechanical test and a wear resistance test were performed on the manufactured halogen-free composition, and the results are also shown in Table 4.

Comparative Example 4

A halogen-free composition was manufactured using the method of Comparative Example 3, but nano-clay (purchased from nanocor, PGN, 5 to 20 nm) was used to replace the nano-silica.

Then, a mechanical test and a wear resistance test were performed on the manufactured composition without halogen-free flame retardant and siloxane polymer, and the results are also shown in Table 4.

Comparative Example 5

Raw materials: thermoplastic polyurethane (purchased from Coating Chemical, ER-85A), the nano-silica aqueous suspension without silane modification of Comparative Preparation Example 1, and antioxidant (purchased from BASF, Irganox-245).

According to the proportions in Table 4, the thermoplastic polyurethane (TPU) and antioxidant were directly introduced from the main inlet of the twin-screw extruder into the first zone of the twin-screw extruder, and were mixed, melted and heated at a temperature of 120 to 200° C. and a screw rotation speed of 250 rpm to form a molten mixture.

With a high-pressure pump under a pressure of 40 bars, according to the proportions in Table 4, the nano-silica aqueous suspension obtained in Comparative Preparation Example 1 was introduced from the side inlet of the twin-screw extruder into the second zone of the twin-screw extruder, and was mixed with the molten mixture from the connected first zone, where the side inlet had a temperature of 180° C., and the second zone had a temperature of 200° C. and a screw rotation speed of 250 rpm. During the process, a flow of the suspension of Comparative Preparation Example 1 was controlled by a flow controller, so that the proportions of raw materials in the mixture retained after passing through the second zone were in accordance with Table 4. After extruding the mixture as a strand through water, and pelletizing it with the twin-screw extruder, the mixture was then placed in an oven at 105° C. for 4 hours to obtain a composition without halogen-free flame retardant and siloxane polymer.

Then, a mechanical test and a wear resistance test were performed on the manufactured halogen-free composition, and the results are also shown in Table 4.

Comparative Example 6

A composition without halogen-free flame retardant and siloxane polymer was manufactured using the method of Comparative Example 5, but the HMDS-modified nano-silica aqueous suspension of Preparation Example 2 was used to replace the nano-silica aqueous suspension of Comparative Example 5.

Then, a mechanical test and a wear resistance test were performed on the manufactured composition without halogen-free flame retardant and siloxane polymer, and the results are also shown in Table 4.

Comparative Example 7

A composition without halogen-free flame retardant and siloxane polymer was manufactured using the method of Comparative Example 5, but the GPTMS-modified nano-silica aqueous suspension of Preparation Example 1 was used to replace the nano-silica aqueous suspension of Comparative Example 5.

Then, a mechanical test and a wear resistance test were performed on the manufactured composition without halogen-free flame retardant and siloxane polymer, and the results are also shown in Table 4.

Comparative Example 8

A composition without halogen-free flame retardant and siloxane polymer was manufactured using the method of Comparative Example 7, but the content of the suspension of Preparation Example 1 was increased.

Then, a mechanical test and a wear resistance test were performed on the manufactured composition without halogen-free flame retardant and siloxane polymer, and the results are also shown in Table 4.

TABLE 4

|  | Comparative Example 3 Molten dispersion | Comparative Example 4 Molten dispersion | Comparative Example 5 Aqueous dispersion | Comparative Example 6 Aqueous dispersion | Comparative Example 7 Aqueous dispersion | Comparative Example 8 Aqueous dispersion |
| --- | --- | --- | --- | --- | --- | --- |
| TPU (parts by weight) | 95 | 95 | 95 | 95 | 95 | 90 |
| Nano-$SiO_2$ (parts by weight) | 5 (commercial) | 5 (clay) | 5 (untreated) | 5 (HMDS-treated) | 5 (GPTMS-treated) | 10 (untreated) |
| Antioxidant (phr) | 0.3 | 0.3 | 0.3 | 0.3 | 0.3 | 0.3 |
| Hardness (shore A) | 82 | 82 | 80 | 82 | 82 | 87 |
| Tensile strength (kgf/$cm^2$) | 384 | 212 | 342 | 327 | 413 | 127 |
| Elongation (%) | 569 | 530 | 565 | 575 | 560 | 569 |
| Wear resistance (mg) | 38 | 57 | 45 | 42 | 8 | 95 |

As can be seen from Table 4, Comparative Examples 5 to 7 with aqueous dispersion have better mechanical strength, while Comparative Examples 6 to 7 added with silane modification have better wear resistance. Therefore, it can be inferred that the halogen-free flame-retardant material of the disclosure can achieve better wear resistance if silane-modified nano-silica aqueous suspension is used.

Comparative Example 9

95 parts by weight of thermoplastic polyurethane (purchased from Coating Chemical, ER-85A) was obtained, and was introduced from the main inlet of the twin-screw extruder into the first zone of the twin-screw extruder, and was melted and heated at a temperature of 120 to 200° C. and a screw rotation speed of 250 rpm. Next, with a high-pressure pump under a pressure of 20 to 50 bars, the (3-glycidyloxypropyl)trimethoxysilane-modified nano-silica aqueous suspension obtained in Preparation Example 1 was introduced from the side inlet of the twin-screw extruder into the second zone of the twin-screw extruder, and mixed with the molten thermoplastic polyurethane from the connected first zone, where a temperature of the side inlet was set to 180° C., and the second zone had a temperature of 200° C. and a screw rotation speed of 250 rpm. During the process, a flow of the (3-glycidyloxypropyl)trimethoxysilane-modified nano-silica aqueous suspension of Preparation Example 1 was controlled by a flow controller, so that after the (3-glycidyloxypropyl)trimethoxysilane-modified nano-silica retained after passing through the second zone was mixed with the molten thermoplastic polyurethane from the connected first zone, 100 parts by weight in total of a material may be obtained, where the (3-glycidyloxypropyl)trimethoxysilane-modified nano-silica was 5 parts by weight.

It was observed from the experiment that the (3-glycidyloxypropyl)trimethoxysilane-modified nano-silica suspension of Preparation Example 1, introduced from the side inlet of the twin-screw extruder into the second zone of the twin-screw extruder exhibited a stable flow. Moreover, a torque value obtained from converting the current value measured from the twin-screw extruder revealed a stable value of 55%.

Comparative Examples 10 and 11

The method of Comparative Example 9 was used, but the setting pressures of the high-pressure pump were respectively changed to 18 bars and 52 bars.

It was observed in the experiment that Comparative Example 10 exhibited a large and unstable flow, and a torque value of about 48%. Therefore, when the pressure of the high-pressure pump is less than 20 bars, a stable flow of nano-silica aqueous suspension into the twin-screw extruder can not be maintained.

As for Comparative Example 11, a stable flow was exhibited, but with a relatively high torque value (of about 60%). It means that when the pressure of the high-pressure pump is greater than 50 bars, the current value of the twin-screw extruder increases, showing greater energy consumption.

In summary of the foregoing, the silane-modified nano-silica aqueous suspension of the disclosure has good dispersion. By integrating the process technology of introducing aqueous dispersible nano-silica with the technical knowledge of twin-screw design, the surface-modified nano-silica in a form of pressurized aqueous solution is introduced into the twin-screw extruder, and then is blended with a finely dispersed molten mixture (including a halogen-free flame retardant, a wear-resistant modifier, a thermoplastic elastomer, and an antioxidant). Accordingly, a halogen-free flame-retardant material with comprehensively excellent performance, such as low hardness, high wear resistance, and high flame retardancy is obtained, and it is applicable for a wear-resistant halogen-free flame-retardant cable sheathing material.

The invention is disclosed in, but not limited to, the above embodiments. It is possible for anyone with ordinary skills in the related art to make some alterations and modifications without departing from the spirit and scope of the invention. Therefore, the protection scope of the invention shall depend on the appended claims.

What is claimed is:

1. A forming method of a halogen-free flame-retardant material, comprising:
    providing, a twin-screw extruder comprising a first zone and a second zone;
    mixing, melting and heating a mixture in the first zone to form a molten mixture, wherein the mixture comprises a halogen-free flame retardant, a wear-resistant modifier, a thermoplastic elastomer, and an antioxidant; and
    introducing a silane-modified nano-silica aqueous suspension into the second zone to mix the silane-modified nano-silica aqueous suspension with the molten mixture from the first zone,
    wherein the first zone and the second zone are continuously connected regions, and
    a pump pressure for introducing the silane-modified nano-silica aqueous suspension into the second zone is 20 to 50 bars.

2. The forming method of a halogen-free flame-retardant material as described in claim 1, wherein the silane-modified nano-silica aqueous suspension comprises silane, nano-silica powder, and water, and based on 100 parts by weight of the total weight of the mixture, a content of the nano-silica powder is 0.5 to 12 parts by weight.

3. The forming method of a halogen-free flame-retardant material as described in claim 1, wherein the mixture further comprises a volume resistivity enhancer modified elastomer.

4. The forming method of a halogen-free flame-retardant material as described in claim 3, wherein the volume resistivity enhancer modified elastomer comprises a styrene-ethylene/butylene-styrene copolymer thermoplastic elastomer or a polyolefin elastomer.

5. The forming method of a halogen-free flame-retardant material as described in claim 3, wherein based on 100 parts by weight of the total weight of the mixture, a content of the volume resistivity enhancer modified elastomer is 5 to 30 parts by weight.

6. The forming method of a halogen-free flame-retardant material as described in claim 1, wherein the halogen-free flame retardant comprises a phosphorus nitrogen flame retardant, aluminum phenylphosphinate, aluminum hypophosphite, melamine cyanurate, a phosphate amine salt, or a phosphate ester.

7. The forming method of a halogen-free flame-retardant material as described in claim 1, wherein the wear-resistant modifier comprises a siloxane polymer, vinyl polydimethylsiloxane, or a methicone silsesquioxane crosspolymer.

8. The forming method of a halogen-free flame-retardant material as described in claim 1, wherein the thermoplastic elastomer comprises polyether thermoplastic polyurethane, polyester thermoplastic polyurethane, a polyether thermoplastic polyester elastomer, or a polyester thermoplastic polyester elastomer.

9. The forming method of a halogen-free flame-retardant material as described in claim 1, wherein the antioxidant comprises bis[3-(1,1-dimethylethyl)-4-hydroxy-5-methyl-benzenepropionic acid] tripolyethylene glycol or a hindered phenolic antioxidant.

10. The forming method of a halogen-free flame-retardant material as described in claim 1, wherein based on 100 parts by weight of the total weight of the mixture, a content of the halogen-free flame retardant is 15 to 45 parts by weight.

11. The forming method of a halogen-free flame-retardant material as described in claim 1, wherein based on 100 parts by weight of a weight of the thermoplastic elastomer, a content of the wear-resistant modifier is 1 to 10 parts by weight.

12. The forming method of a halogen-free flame-retardant material as described in claim 1, wherein based on 100 parts by weight of a weight of the thermoplastic elastomer, a content of the antioxidant is 0.2 to 1.5 parts by weight.

13. The forming method of a halogen-free flame-retardant material as described in claim 1, wherein the first zone of the twin-screw extruder has a temperature of 120° C. to 200° C.

14. The forming method of a halogen-free flame-retardant material as described in claim 1, wherein the second zone of the twin-screw extruder has a temperature of 120° C. to 200° C.

15. The forming method of a halogen-free flame-retardant material as described in claim 1, wherein a screw rotation speed in the first zone and the second zone of the twin-screw extruder is 60 rpm to 300 rpm.

* * * * *